United States Patent [19]
Wautier

[11] Patent Number: 5,468,837
[45] Date of Patent: Nov. 21, 1995

[54] PROCESS FOR THE MANUFACTURE OF POLY-EPSILON-CAPROLACTONES AND POLY-EPSILON-CAPROLACTONES WHICH HAVE HIGH MOLECULAR MASSES OBTAINABLE BY THIS PROCESS

[75] Inventor: Henri Wautier, Braine-le-Comte, Belgium

[73] Assignee: Solvay (Société Anonyme), Brussels, Belgium

[21] Appl. No.: 235,676

[22] Filed: Apr. 29, 1994

[30] Foreign Application Priority Data

May 17, 1993 [BE] Belgium .............................. 09300507

[51] Int. Cl.⁶ .................................................. C08G 63/08
[52] U.S. Cl. ....................... 528/357; 528/354; 528/361
[58] Field of Search ................................ 528/354, 357, 528/361

[56] References Cited

U.S. PATENT DOCUMENTS 3,021,313  2/1962  Cox et al. ............................... 528/357
4,090,996  5/1978  Gergen et al. .......................... 524/505

FOREIGN PATENT DOCUMENTS 775479  3/1972  Belgium .
0255941  2/1988  European Pat. Off. .
0372221  6/1990  European Pat. Off. .

OTHER PUBLICATIONS

Macromolecules, vol. 21, No. 2, 1988, Easton US, pp. 286–293. Hans R. Kricheldorf et al.: "Poly(lactones). Polymerization Mechanism of Metal Alkoxide Initiated Polymerizations of Lactide and Various Lactones".

Primary Examiner—Shelley A. Dodson
Attorney, Agent, or Firm—Spencer, Frank & Schneider

[57] ABSTRACT

The poly-ε-caprolactones are manufactured by continuous polymerization of ε-caprolactone as a melt in an extruder (reactive extrusion) with the involvement of a polymerization initiator chosen from aluminum alkoxides. The appropriate adjustment of the extruder feed rates of ε-caprolactone and of aluminum alkoxide allows the customized manufacture of poly-ε-caprolactones which have high and preestablished weight-average molecular masses.

Poly-ε-caprolactones obtainabled by the process are characterized by weight-average molecular masses ($M_w$) equal to at least approximately 95,000 g/mol and $M_w/M_n$ ratios of at least approximately 2.

10 Claims, No Drawings

PROCESS FOR THE MANUFACTURE OF POLY-EPSILON-CAPROLACTONES AND POLY-EPSILON-CAPROLACTONES WHICH HAVE HIGH MOLECULAR MASSES OBTAINABLE BY THIS PROCESS

FIELD OF THE INVENTION

The present invention relates to a process for the manufacture of poly-ε-caprolactones, and to poly-ε-caprolactones of high molecular masses which can be obtained by this process.

The invention relates more particularly to a process for the manufacture of poly-ε-caprolactones by continuous polymerization of ε-caprolactone as a melt in an extruder.

TECHNOLOGY REVIEW

Poly-ε-caprolactones of high molecular masses are well-known biocompatible and biodegradable thermoplastic polymers exhibiting a high compatibility with many thermoplastic and elastomeric polymers and finding many outlets in fields as diverse as orthopaedics (prostheses), pharmacy (coating of medications with a view to the controlled release of the active substance), medicine (solutions for the temporary protection of severe burns), agriculture (protective films), paint and coatings, and the like.

For all the applications involving the conversion of poly-ε-caprolactones into finished or semifinished articles by melt-processing of the poly-ε-caprolactones it is highly desirable to have available solid poly-ε-caprolactones of weight-average molecular masses ($M_w$) which are high and at least equal to at least approximately 95,000 g/mol.

It is well known to manufacture poly-ε-caprolactones of high weight-average molecular masses by bulk polymerization of ε-caprolactone involving catalysts or else polymerization initiators such as organic or inorganic tin salts or else organotins.

Belgian Patent BE-A-775,479 (Degussa) describes a non-continuous process making it possible to produce poly-ε-caprolactones whose weight-average molecular masses are up to several tens of thousands with the involvement of initiators consisting of organic tin compounds, such as alkyltin alcoholates like, for example, tributyltin methylate. However, the polymerization periods take several hours, and this makes the process unattractive industrially because of its low output efficiency. In addition, the production of poly-ε-caprolactones of high weight-average molecular masses presents acute practical problems in isolating the polymer from the reactor at the end of the polymerization cycle.

In order to alleviate these problems inherent in the non-continuous production of polyesters of high average molecular masses it has already been proposed to produce resorbable polyesters by continuous polymerization of glycolides, lactides and/or lactones in an extruder (Patent Application EP-A-0,372,221 in the name of Boehringer Ingelheim KG), that is to say by reactive extrusion. This document discloses, quite generally, the possibility of producing poly-ε-caprolactones. However, the only catalysts or polymerization initiators envisaged and furthermore described as being preferred in this document are tin octoate and tin salts such as, for example, stannous chloride. This process has in practice been found to be inapplicable to the manufacture of poly-ε-caprolactones by continuous polymerization of ε-caprolactone in an extruder, given that the recommended catalysts require polymerization periods of several hours to reach degrees of conversion to poly-ε-caprolactone which are industrially acceptable.

SUMMARY OF THE INVENTION

The subject of the present invention is a process for the manufacture of poly-ε-caprolactones by continuous polymerization in an extruder (reactive extrusion), which allows the production of solid poly-ε-caprolactones of weight-average molecular masses that can be varied at will, including very high weight-average molecular masses, and does so with an extremely high output efficiency, that is to say with mean residence times of the material in the extruder not exceeding a few tens of minutes, or even a few minutes.

DETAILED DESCRIPTION OF THE INVENTION

To this end, the present invention relates to a process for the manufacture of poly-ε-caprolactones by continuous polymerization of ε-caprolactone as a melt in an extruder with the involvement of a polymerization initiator, characterized in that the polymerization initiator is chosen from aluminium alkoxides.

Polymerization as a melt is hereinafter intended to denote polymerization in the substantial absence of any solvent or diluent, at a temperature at least equal to the melting temperature of the poly-ε-caprolactones produced.

For the purposes of the present invention, an extruder is intended to denote any continuous device comprising a feed zone and a discharge zone, through which the molten substance is forced to pass with mean residence times not exceeding approximately 30 minutes.

For the purpose of the present invention, poly-ε-caprolactones are intended to denote both ε-caprolactone homopolymers and copolymers of ε-caprolactone with other lactones with a predominant weight content of ε-caprolactone, such as, for example, copolymers of ε-caprolactone and β-propiolactone or else copolymers of ε-caprolactone and δ-valerolactone with a predominant content of ε-caprolactone. It is therefore to be understood that the process of the invention applies equally well to the homopolymerization of ε-caprolactone and to its copolymerization with other lactones. Nevertheless, the process according to the invention is particularly suitable for the manufacture of poly-ε-caprolactones by homopolymerization of ε-caprolactone.

For the purpose of the present invention, aluminium alkoxide is intended to denote organoaluminium compounds containing at least one aluminoxane-carbon bond (>Al—O—C—) and mixtures of such organoaluminium compounds.

The paper under the name of Hans R. Kricheldoff et al., published in Macromolecules 1988, 21, pp. 286–293 and entitled "Poly(lactones). Polymerization Mechanism of Metal Alkoxide Initiated Polymerization of Lactide and Various Lactones" reproduces a table in which there appear the comparative results of the noncontinuous bulk polymerization of ε-caprolactone at 100° C. involving various metal alkoxides, such as aluminium isopropylate and dibutyltin methylate, from which it appears that after a polymerization cycle lasting 24 hours, these various alkoxides produce appreciably identical yields of poly-ε-caprolactone, of the order of 90%.

It was therefore surprising to find that, in contrast to tin alkoxide type, polymerization initiators of the aluminium alkoxide type, as defined above, make it possible to produce, within a few minutes, generally within approximately at most 30 minutes and with degrees of conversion and in yields which are very high, generally much better than 95% by weight, solid poly-ε-caprolactones of high weight-average molecular masses, which makes them choice polymerization initiators for the continuous polymerization of ε-caprolactone as a melt in an extruder.

Examples of aluminium alkoxides which are suitable as polymerization initiators in the process of the invention are those corresponding to the general formula below:

$$(R')_{3-n}\text{—Al—}(O\text{—}R)_n$$

in which:

R and R' independently of each other denote a linear or branched hydrocarbon radical; and n denotes a number ranging from 1 to 3.

Among these, preference is given to the aluminium alkoxides of above general formula in which R and R' independently of each other denote a linear or branched alkyl radical containing from 1 to 16 carbon atoms, and still more particularly from 2 to 8 carbon atoms. Excellent results have been obtained with alkoxides of above general formula in which R and R' are identical and denote a linear or branched alkyl radical containing from 2 to 6 carbon atoms.

By way of examples of such preferred aluminium alkoxides there may be mentioned aluminium mono-, di- and triethoxides, aluminium mono-, di- and tripropoxides, aluminium mono-, di- and triisopropoxides, aluminium mono-, di- and tributoxides and aluminium mono-, di- and tri-sec-butoxides. Excellent results have been obtained with aluminium triisopropoxide (or else aluminium tri-2-propanolate) and with aluminium tri-sec-butoxide (or else aluminium tri-2-butanolate). The latter offers the advantage of being liquid at ambient temperature.

The alkoxides which are solid at ambient temperature will be advantageously introduced into the extruder in the form of a solution in an inert organic solvent such as, for example, hexane, heptane or toluene.

Aluminium alkoxides are well-known products. They can be obtained, for example, by reacting, in appropriate quantities, an alkylaluminium (R'₃Al) with an organic hydroxyl compound of formula R—OH, R' and R having the meanings described and defined in relation to the general formula above.

The quantity of polymerization initiator to be used in the polymerization of ε-caprolactone can vary within quite wide limits and depends essentially on the weight-average molecular masses ($M_w$) aimed at in the case of the poly-ε-caprolactones. It has been found, in fact, that a practically linear relation, independent of the polymerization temperature, exists between, on the one hand, the ratio of the extruder feed rates of ε-caprolactone and of polymerization initiator and, on the other hand, the weight-average molecular mass ($M_w$) of the poly-ε-caprolactone produced.

The process according to the invention allows the manufacture of poly-ε-caprolactones with approximate weight-average molecular masses ($M_w$) preestablished by adjusting the extruder feed rates of ε-caprolactone and of polymerization initiator, which are calculated in accordance with the following equation:

$$M_w = \frac{2.25}{n} \cdot \frac{\text{ε-caprolactone feed rate (in g/min)}}{\text{initiator feed rate (no. of moles of Al/min)}}$$

in which n has the same meaning as in the general formula of the alkoxides above, that is to say that n denotes the number of aluminoxane-carbon bonds present in one mole of polymerization initiator (and no. is the abbreviation for the word "number").

It is quite obvious that, ideally, all the reactants used in the polymerization process according to the invention must be anhydrous. Nevertheless, residual water contents not exceeding 200 mg/kg of lactone and still more particularly not exceeding 100 mg/kg of lactone can be tolerated because they have no significant effect on the weight-average molecular mass of the poly-ε-caprolactones produced according to the process of the invention.

An advantage of the process of the invention lies therefore in the possibility of "customized" production of poly-ε-caprolactones which have weight-average molecular masses approximately preestablished by using calculated and appropriate quantities of polymerization initiator according to the invention. Poly-ε-caprolactones exhibiting very variable weight-average molecular masses ranging from approximately 20,000 to approximately 600,000 g/mol have been successfully produced without any problem within a few minutes by continuous extrusion of ε-caprolactone in accordance with the process of the invention. Nevertheless, the latter is very particularly advantageous for the manufacture of poly-ε-caprolactones of weight-average molecular masses which are so high that it is difficult to isolate them from the reactors at the end of a noncontinuous polymerization cycle. This is why the process of the invention applies preferably to the manufacture of poly-ε-caprolactones which have weight-average molecular masses ($M_w$) equal to at least approximately 75,000 g/mol, and more particularly equal to at least approximately 95,000 g/mol.

The absence of any significant effect of the polymerization temperature (that is to say of the temperature of the stock in the extruder) on the molecular masses of the poly-ε-caprolactones produced furthermore offers the advantage that the temperature differences between the various zones of the extruder do not therefore have any significant effect on the molecular masses of the poly-ε-caprolactones produced. In fact, the polymerization temperature essentially affects the polymerization rate. In the process according to the invention the temperature in the extruder can therefore fluctuate without any disadvantage to a quite wide extent, provided that it is at least equal to the melting temperature of the poly-ε-caprolactones produced. To give an idea, the minimum temperature for the homopolymerization of ε-caprolactone will lie at 60° C. Higher temperatures make it possible to accelerate the polymerization rate. Nevertheless, in practice 200° C. and, preferably, approximately 185° C. will not generally be exceeded, so as to avoid any risk of degradation of the poly-ε-caprolactones produced.

Furthermore, the polymerization temperature will be chosen so as to reach degrees of conversion and yields close to 100% with mean residence times of the reaction mass in the extruder not exceeding approximately 30 minutes. These average residence times depend, of course, on the extruder configuration and, where applicable, on the speed of rotation of the screw(s).

Excellent results have been obtained by continuous polymerization of ε-caprolactone as a melt at a temperature of approximately between 130° and 180° C. with mean residence times in the extruder not exceeding approximately 30 minutes and generally not exceeding approximately 15 minutes. In all cases degrees of conversion and yields which are much higher than 95% have been obtained.

The extruders as defined above which are very particularly suitable for carrying out the process according to the invention will need to be capable of accomplishing the following functions: mixing the substances introduced, in this case the monomer(s) and the polymerization initiator, unless the latter are mixed before the extruder feed, conveying the substances from the feed point to a die and removing the heat of reaction. They will be advantageously provided with a degassing vent. Any known and conventional extruders based on the work of one, two or a number of screws, whether rotating in the same or opposite directions, are suitable for performing the process according to the invention. Excellent results have been obtained with extruders with two screws rotating together.

The extruded reeds will be cooled before being granulated by techniques which are well known to a person skilled in the art.

The poly-ε-caprolactones produced in accordance with the process of the invention differ especially from those produced with the involvement of tin derivatives such as tin octoate and chloride, in a wider distribution of average molecular masses, that is to say in a higher $M_w/M_n$ ratio. It is well known that the spread of the molecular masses on a weight basis constitutes a characteristic that is sought after when it is desired to use polymers of very high molecular masses for the melt-manufacture of thin articles such as flasks or films, such as blown films.

The present invention also relates to poly-ε-caprolactones obtainable by the process according to the invention and characterized by a weight-average molecular mass ($M_w$) equal to at least approximately 95,000 g/mol and by a ratio of the weight-average molecular mass to the number-average molecular mass ($M_w/M_n$) of at least 2, the said average molecular masses being evaluated by gel permeation chromatography (GPC) in tetrahydrofuran at 25° C. Among the poly-ε-caprolactones obtainable by the process according to the invention, preference is given to those which exhibit an $M_w/M_n$ ratio of at least 2.20. This ratio usually does not exceed 3.25 and still more particularly it does not exceed 3. Poly-ε-caprolactones which are very particularly preferred consist of ε-caprolactone homopolymers exhibiting a weight-average molecular mass equal to at least approximately 115,000 g/mol and, furthermore, not higher than approximately 200,000 g/mol, and an $M_w/M_n$ ratio of at least 2.20.

The poly-ε-caprolactones according to the invention are suitable for the melt-manufacture of very diverse articles such as, for example, sheets, films and flasks, by any of the usual techniques for converting thermoplastics, such as moulding, extrusion, blow-extrusion and the like.

EXAMPLES

The examples which follow are intended to illustrate the process of the invention.

All the examples were produced in a continuous horizontal reactor of the extruder type, provided essentially with:

two conveying (constant pitch) screws rotating together, self-cleaning and with deep flights with the following dimensions:

| pitch: | 17.5 mm |
| length: | 750 mm |
| diameter: | 78 mm; | a dome acting as a degassing vent, situated at the top of the reactor and provided with a device for introducing the initiator;

a gear pump situated at the end of the reactor and intended to push the molten polymer through a die;

a jacket for circulating a heat transfer fluid;

a temperature sensor situated before the pump.

In Examples 1 to 5 the polymerization initiator employed is aluminium triisopropoxide. In Example 6 it is aluminium tri-sec-butoxide.

Examples 1 to 4

The extruder is fed at ambient temperature with ε-caprolactone (water content: 92 mg/kg) at a constant rate set at 6.6 kg/h.

A solution of aluminium triisopropoxide in heptane, filtered and kept under nitrogen, assaying at 21.8 g of aluminium/kg of solution, is introduced at ambient temperature at the beginning of the degassing vent (that is approximately at 100 mm from the beginning of the screw) at a constant rate set at the value given in the appended table.

The extruder is cooled by circulating oil in the jacket which is maintained at an entry temperature of 130° C., and the speed of rotation of the screws is kept constant and equal to 7 rev/min.

The temperature of the poly-ε-caprolactone, measured at the exit of the screw (polymerization temperature) is 160° C. The mean residence time of the stock in the extruder is estimated at approximately 15 minutes.

On leaving the die the poly-ε-caprolactone is cooled and granulated. The weight- and number-average molecular masses ($M_w$) and ($M_n$) are evaluated by gel permeation chromatography (GPC) in tetrahydrofuran at 25° C.

Table I, appended, shows, in addition to the feed rates of the polymerization initiator, the measured $M_w$ and $M_n$ values and the value of $M_w$ calculated according to the equation shown in detail above.

Example 5

This example conforms in all respects to the general operating method of Examples 1 to 4, except that the ε-caprolactone feed rate was 9.7 kg/h, the initiator solution feed rate 75 g/h (that is 0.0606 mol of Al/h) and the speed of rotation of the screws 36 rev/min. Under these polymerization conditions the temperature of the poly-ε-caprolactone, measured at the screw delivery (polymerization temperature) was 178° C. The mean residence time of the stock in the extruder is estimated at approximately 6 minutes.

The poly-ε-caprolactone produced exhibits the following characteristics:

| $M_w$ (measured): | 128,000 g/mol |
| $M_w$ (calculated): | 120,000 g/mol |
| $M_w/M_n$: | 2.3 |

Example 6

This example conforms in all respects to the general operating method of Example 1, except that the ε-caprolactone feed rate was 10.3 kg/h, the aluminium tri-sec-butoxide (purity: 97%) feed rate 21 g/h, that is 0.0828 mol of Al/h and the screw speed 7 rev/min. Under these polymerization conditions the temperature of the poly-ε-caprolactone, measured at the screw delivery (polymerization temperature) was 180° C. The mean residence time of the stock in the extruder is estimated at approximately 10 minutes.

The poly-ε-caprolactone produced exhibits the following characteristics:

| | |
|---|---|
| $M_w$ (measured): | 96,000 g/mol |
| $M_w$ (calculated): | 93,000 g/mol |
| $M_w/M_n$: | 2.2 |

The degrees of conversion and the yields of poly-ε-caprolactone were >99% in all the examples.

TABLE I

| Example No. | Initiator feed rate, mol Al/h | Calculated $M_w$ | Measured $M_w$ | $M_w/M_n$ |
|---|---|---|---|---|
| 1 | 0.0581 | 85,000 | 87,000 | 2.5 |
| 2 | 0.0468 | 106,000 | 108,000 | 2.6 |
| 3 | 0.0388 | 128,000 | 132,000 | 2.5 |
| 4 | 0.0307 | 161,000 | 165,000 | 2.5 |

I claim:

1. In a process for the manufacture of poly-ε-caprolactones by continuous polymerization of ε-caprolactone as a melt in an extruder, the improvement comprising a polymerization initiator chosen from aluminium alkoxides including at least one aluminoxane-carbon bond.

2. The process for the manufacture of poly-ε-caprolactones according to claim 1, wherein the aluminium alkoxides correspond to the formula below:

$$(R')_{3-n}\text{—Al—}(O\text{—}R)_n$$

in which:

R and R' independently of each other denote a linear or branched hydrocarbon radical; and n denotes the number of aluminoxane-carbon bonds and is a number ranging from 1 to 3.

3. The process for the manufacture of poly-ε-caprolactones according to claim 2, wherein R and R', independently of each other, each denote a linear or branched alkyl radical containing from 1 to 16 carbon atoms.

4. The process for the manufacture of poly-ε-caprolactones according to claim 2, wherein R and R' are identical and each denotes a linear or branched alkyl radical containing from 2 to 6 carbon atoms.

5. The process for the manufacture of poly-ε-caprolactones according to claim 1, including manufacturing poly-ε-caprolactones with approximate weight-average molecular masses ($M_w$) preestablished by adjusting the extruder feed rates of ε-caprolactone and of polymerization initiator chosen from aluminium alkoxides including at least one aluminoxane-carbon bond, which are calculated in accordance with the following equation:

$$M_w = \frac{2.25}{n} \cdot \frac{\epsilon\text{-caprolactone feed rate (in g/min)}}{\text{initiator feed rate (no. of moles of Al/min)}}$$

in which n is a number ranging from 1 to 3 and denotes the number of aluminoxane-carbon bonds present in one mole of polymerization initiator.

6. The process for the manufacture of poly-ε-caprolactones according to claim 1, wherein the polymerization temperature is approximately between 130° and 180° C. and the mean residence time in the extruder does not exceed 30 minutes.

7. The process for the manufacture of poly-ε-caprolactones according to claim 1, wherein said polymerization of ε-caprolactone is homopolymerization of ε-caprolactone.

8. Poly-ε-caprolactones made by the process according to claim 1, having a weight-average molecular mass ($M_w$) equal to at least approximately 95,000 g/mol and an $M_w/M_n$ of at least 2.

9. Poly-ε-caprolactones according to claim 8, having an $M_w/M_n$ ratio of at least 2.20 and not exceeding 3.25.

10. Poly-ε-caprolactones according to claim 8, consisting of ε-caprolactone homopolymers exhibiting a weight-average molecular mass equal to at least approximately 115,000 g/mol and not higher than approximately 200,000 g/mol, and a $M_w/M_n$ ratio of at least 2.20.

\* \* \* \* \*